United States Patent
Patel et al.

(10) Patent No.: US 12,049,539 B2
(45) Date of Patent: Jul. 30, 2024

(54) CYCLOALIPHATIC AMINES FOR EPOXY FORMULATIONS: A NOVEL CURING AGENT FOR EPOXY SYSTEMS

(71) Applicant: Evonik Operations GmbH, Essen (DE)

(72) Inventors: Pritesh G. Patel, Breinigsville, PA (US); Gamini Ananda Vedage, Bethlehem, PA (US); Peter Lucas, Allentown, PA (US); Joseph DiBiase, Nazareth, PA (US)

(73) Assignee: Evonik Operations GmbH, Essen (DE)

( * ) Notice: Subject to any disclaimer, the term of this patent is extended or adjusted under 35 U.S.C. 154(b) by 385 days.

(21) Appl. No.: 16/976,660

(22) PCT Filed: Mar. 4, 2019

(86) PCT No.: PCT/EP2019/055237
§ 371 (c)(1),
(2) Date: Aug. 28, 2020

(87) PCT Pub. No.: WO2019/170563
PCT Pub. Date: Sep. 12, 2019

(65) Prior Publication Data
US 2021/0054134 A1 Feb. 25, 2021

Related U.S. Application Data

(60) Provisional application No. 62/638,413, filed on Mar. 5, 2018.

(51) Int. Cl.
*C08G 59/50* (2006.01)
*C08G 59/22* (2006.01)
(Continued)

(52) U.S. Cl.
CPC ......... *C08G 59/5026* (2013.01); *C08G 59/22* (2013.01); *C08G 59/5033* (2013.01);
(Continued)

(58) Field of Classification Search
CPC .... C08G 59/5026; C08G 59/56; C08G 59/22; C08G 59/5033; C08K 7/02; C08J 5/04
See application file for complete search history.

(56) References Cited

U.S. PATENT DOCUMENTS 2,890,194 A 6/1959 Phillips et al.
3,096,349 A 7/1963 Meyer
(Continued)

FOREIGN PATENT DOCUMENTS

DE 130580 A2 4/1978
EP 3002314 A1 4/2016
(Continued)

OTHER PUBLICATIONS

PCT International Search Report mailed Apr. 30, 2019 corresponding to PCT Application No. PCT/EP2019/055237 filed Mar. 4, 2019 (16 pages).
(Continued)

*Primary Examiner* — Megan McCulley
(74) *Attorney, Agent, or Firm* — Andrew H. Chung; Linda S. Li; Jason S. Ngui

(57) ABSTRACT

The present invention relates to an epoxy resin system containing the reaction product of an epoxy resin component and an amine-based curing agent component comprising a first amine component and a second amine component, and a method for producing the epoxy resin system comprising combining an epoxy resin component with an amine-based curing agent component to form an initial epoxy resin composition, the amine-based curing agent component comprising a first amine component and a second amine component
(Continued)

ponent; and allowing a chemical reaction to occur between the amine-based curing agent component and the epoxy resin component to form a cured epoxy resin composition. The first amine component is N-(3-aminopropyl) cyclohexylamine and the second amine component is the hydrogenated product of oligomeric structure from the 4,4'-Methylenedianiline process.

9 Claims, 1 Drawing Sheet

(51) Int. Cl.
    *C08G 59/56*      (2006.01)
    *C08J 5/04*      (2006.01)
    *C08J 5/24*      (2006.01)

(52) U.S. Cl.
    CPC .............. *C08G 59/56* (2013.01); *C08J 5/04* (2013.01); *C08J 5/249* (2021.05); *C08J 2363/00* (2013.01)

(56) References Cited

U.S. PATENT DOCUMENTS

| | | | |
|---|---|---|---|
| 3,449,353 A | 6/1969 | Porret et al. | |
| 4,294,792 A | 10/1981 | Arons et al. | |
| 5,280,091 A * | 1/1994 | Dubowik | C08G 59/5026 528/122 |
| 5,559,086 A | 9/1996 | Dewprashad et al. | |
| 6,288,208 B1 | 9/2001 | Moshinsky | |
| 6,329,473 B1 | 12/2001 | Marten et al. | |
| 7,683,154 B2 | 3/2010 | Volle | |
| 10,253,225 B2 | 4/2019 | van Gorkom et al. | |
| 2008/0139728 A1 | 6/2008 | Klopsch et al. | |
| 2009/0227718 A1 | 9/2009 | Tanimoto et al. | |
| 2010/0048827 A1 | 2/2010 | Walker et al. | |
| 2010/0285311 A1 | 11/2010 | Steidl et al. | |
| 2011/0190420 A1 | 8/2011 | Nagelsdiek et al. | |
| 2011/0218270 A1 | 9/2011 | Suter et al. | |
| 2014/0243557 A1 | 8/2014 | Altenhoff et al. | |
| 2014/0275446 A1 | 9/2014 | Kramer et al. | |
| 2014/0288247 A1 | 9/2014 | Burckhardt et al. | |
| 2014/0309334 A1 | 10/2014 | Kramer et al. | |
| 2015/0093582 A1 | 4/2015 | Buening et al. | |
| 2015/0337076 A1 | 11/2015 | Kasemi et al. | |
| 2015/0368466 A1 | 12/2015 | Kelch et al. | |
| 2016/0326300 A1 | 11/2016 | Gelves et al. | |
| 2017/0137562 A1 | 5/2017 | Zheng et al. | |
| 2017/0166687 A1 | 6/2017 | Ortelt et al. | |
| 2017/0240691 A1 * | 8/2017 | Zheng | C08G 59/502 |
| 2017/0253779 A1 | 9/2017 | Schlechte et al. | |
| 2017/0355810 A1 | 12/2017 | Langkabel et al. | |
| 2018/0162991 A1 | 6/2018 | Ortelt et al. | |

FOREIGN PATENT DOCUMENTS

| | | |
|---|---|---|
| EP | 3170849 A1 | 5/2017 |
| EP | 3178861 A1 | 6/2017 |
| EP | 3178863 A1 | 6/2017 |
| WO | 2009089145 A1 | 7/2009 |
| WO | 2012174989 A1 | 12/2012 |
| WO | 2016208618 A1 | 12/2016 |

OTHER PUBLICATIONS

M. Vecera, J. Mleziva: "The influence of the molecular structure on the chemical resistivity of solventless and high-solid epoxy resins", Progress in oranic coatings, vol. 26, No. 2-4, Sep. 1, 1995 (Sep. 1, 1995), pp. 251-263 (13 pages).

Vladimir Liska und Gabriela Adamkova: "Konversion von Epoxidharzen im Krischen Zustand", angewandte Makromolekulare Chemie, applied Macromolecularechemistry and Physics., vol. 99, No. 1, Oct. 6, 1981 (Oct. 6, 1981), pp. 133-144 (12 pages).

Office Action mailed on Nov. 7, 2022 for Chinese Application No. 201980015366.7.

* cited by examiner

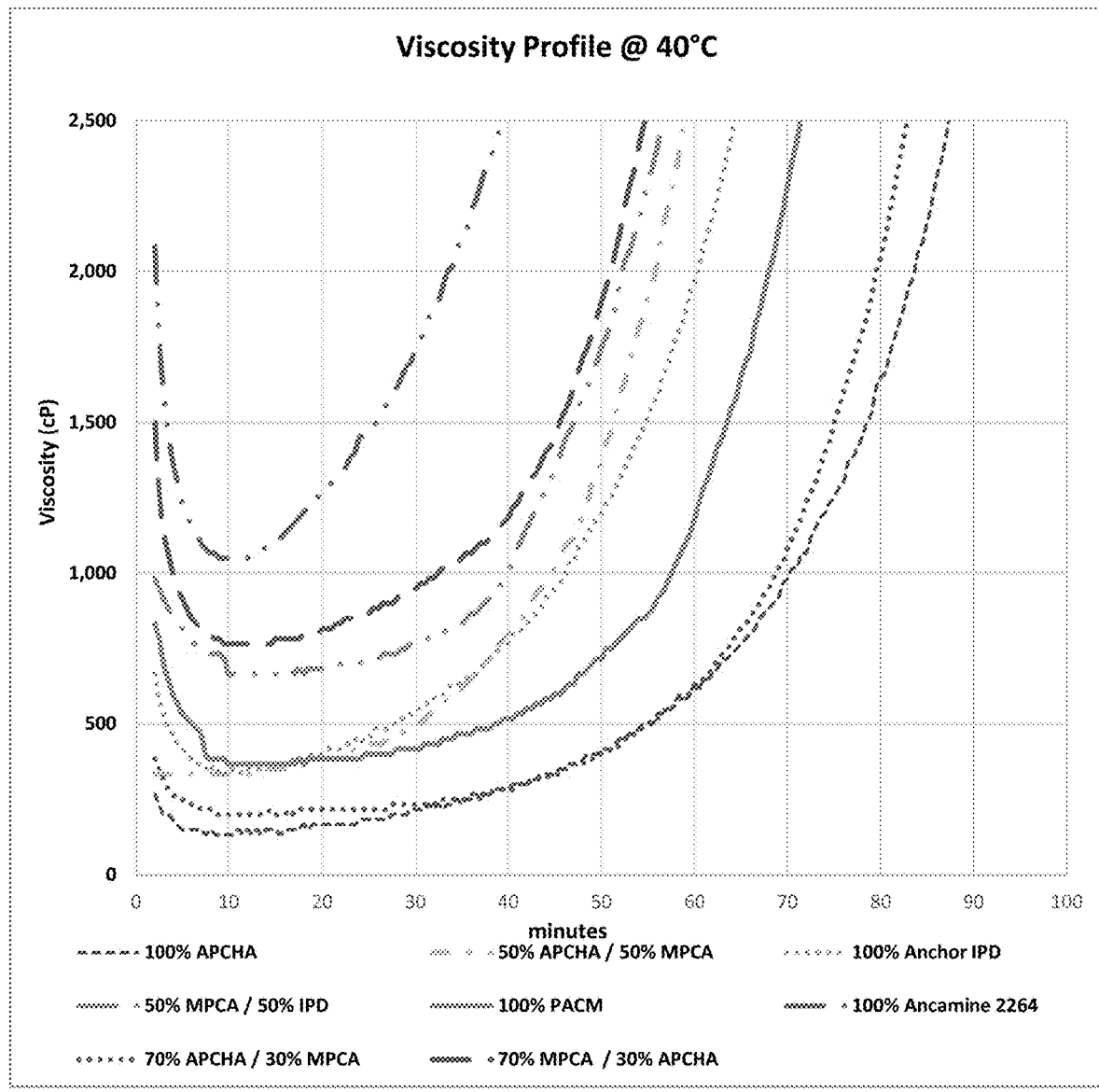

CYCLOALIPHATIC AMINES FOR EPOXY FORMULATIONS: A NOVEL CURING AGENT FOR EPOXY SYSTEMS

This Application is a § 371 national stage of PCT International Application No. PCT/EP2019/055237, filed Mar. 4, 2019, which claims the benefit of U.S. Application No. 62/638,413, filed Mar. 5, 2018, the contents of each of which are hereby incorporated by reference in their entirety into this application.

BACKGROUND OF THE INVENTION

Cycloaliphatic amines are commonly used as epoxy curing agents for heat cured structural composite applications. The class of amine used as a curing agent is vital to achieve the final performance of the cured product. Each of the amine classes, primary or secondary, is cured at a specific temperature in order to achieve full cure. The cure temperature dictates the final service temperature, which is indicated by its $T_g$. In general, epoxy resins are predominately cured with primary and secondary amines. Tertiary amines are generally used as co-curing agents or catalysts in combination with primary and secondary amines.

Epoxy resin systems are used in the manufacturing of various structural parts, including composites. Examples of articles that are being evaluated for manufacturing from epoxy resin systems include composite pipes, pressure vessels, automotive parts and windmill blades. Fabricating such parts includes a number of requirements for effective manufacturing especially when complex manufacturing processes are used. These processes include but are not limited to resin infusion, resin transfer molding, filament winding and large casting. One need in the art is for reduced exothermic heat release during the epoxy resin system cure of the article in thicker sections of the article, since in such sections, the exothermic heat released during cure cannot be easily conducted away from the article. If excessive temperatures are reached during the cure process, thermal degradation of the cured resin in the "hot spots" can occur with resultant mechanical property loss in the fabricated parts.

Additionally, during cure, the composite parts may undergo thermal shrinkage. Thermal shrinkage of a cured epoxy resin causes stresses to build up in a composite during cool down from the maximum temperature reached at or after gelation. The stresses sometimes lead to interlaminar cracking in the article, with resultant loss of mechanical properties. The higher the temperature reached during cure after the gel point, the greater the amount of stress that will accumulate in the article during cooling.

Standard epoxy systems for fabricating structural parts are cured with stoichiometric quantities of aliphatic amines, usually primary amines. The systems generally have high cure exothermic temperatures, with the center of a 100-gram mass of resin/curing agent mixture contained within a three inch diameter cylinder often reaching a peak temperature of 250° C. or higher when cured in a 70° C. oven. Alternatively, epoxy systems cured with anhydride-based curing agents may often have lower cure exothermic heat release than those cured with primary amines. However, anhydride-cured systems typically require higher mold temperatures than systems cured with primary aliphatic amines to reach an acceptable degree of cure and level of cured properties.

Cycloaliphatic amines currently used in epoxy formulations are known to require a higher temperature (>130 C for 2 hrs) to achieve full cure in a short time. Some limitations to achieving full cure at such a high temperature include (1) increased fuming/volatility of an amine before it crosslinks with the epoxy group which creates an environmental concern and unsafe working conditions for the worker in the manufacturing site who may inhale the highly volatile components, and (2) an excessive exothermic temperature (>200° C.) during the cure process which may create a hot (burn) spot in the parts and could melt the thermoplastic liner (e.g. HDPE liner use for Filament wound Pressure Vessels).

For an advanced composite to achieve higher performance, multifunctional resins and curing agents are often used. The multifunctional materials usually have a very high starting viscosity. To reduce the formulation viscosity, heat is commonly used. This approach increases the reactivity, thus causing some handling issues. As the composite parts get bigger and thicker the formulation viscosity needs to be lower to have an optimum wetting of a reinforcement (e.g. glass, carbon, Kevlar, natural fiber etc).

Systems for composite processing require an initial mixed viscosity low enough and rate of viscosity increase at the impregnation temperature low enough to enable the reinforcing fiber preform to be completely wet with resin before the resin system becomes too viscous for satisfactory flow through the fibers and fabric of the substrate. The requirement for low initial viscosity and long pot life becomes more stringent as the size of the composite part increases.

WO2016208618A1 discloses a fiber-reinforced composite material obtained using an epoxy resin composition where the epoxy resin composition comprises an epoxy resin including an aromatic ring and having a functionality of 2 or higher and an amine-based hardener or an acid-anhydride based hardener.

In light of the above, there is a need in the art for improved curing agents for producing epoxy resin systems which have reduced exothermic heat release combined with desired cured mechanical properties when compared to the prior art resin compositions. Such curing agents must be free of undesirable features such as volatile emissions.

BRIEF SUMMARY OF THE INVENTION

It has been discovered that cycloaliphatic amines, preferably N-(3-aminopropyl) cyclohexylamine (APCHA) and the hydrogenated product of oligomeric structure from the 4,4'-Methylenedianiline process, can be used as the main curing agent for epoxy resin compositions without inducing the negative impact on mechanical, thermal and chemical properties of the cured product normally seen with cycloaliphatic amine-based curing agents. The major drawback with cycloaliphatic amines is that they require a higher curing or processing temperature to achieve full cure. Using APCHA and the hydrogenated product of oligomeric structure from the 4,4'-Methylenedianiline process as the main curing agent achieves full cure at a significantly lower temperature than current cycloaliphatic amine curing agents. Test results show that using APCHA and the hydrogenated product of oligomeric structure from the 4,4'-Methylenedianiline process as the main curing agent maintains good mechanical, thermal and chemical performance in the cured epoxy composition and exceeds the mechanical properties of other cycloaliphatic amines. In addition, formulations containing APCHA and the hydrogenated product of oligomeric structure from the 4,4'-Methylenedianiline process give lower viscosity, longer pot life, low temperature $T_g$ development and lower exotherm during cure compared to cured epoxy compositions using current cycloaliphatic amine curing agents. APCHA and the hydrogenated product of oligomeric structure from the 4,4'-Methylenedianiline process can also be used in combination with primary and secondary amines as co-curing agents to further enhance the desirable properties. The lower viscosity of APCHA helps in fiber wetting. Preliminary results using APCHA and the hydrogenated product of oligomeric structure from the 4,4'-Methylenedianiline process in composite applications (filament wound pipes & fittings, wind blades, high pressure vessels, structural laminates, automotive body parts, aerospace, etc.) are quite encouraging.

An aspect of the invention is an epoxy curing agent comprising a first amine component, a second amine component, and optionally, a third amine component. The first amine component is N-(3-aminopropyl) cyclohexylamine (APCHA), represented by the formula:

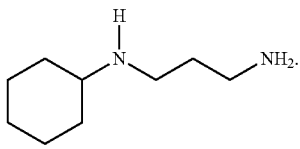 [SMILES: NCCCNC1CCCCC1]

The second amine component is represented by the formula:

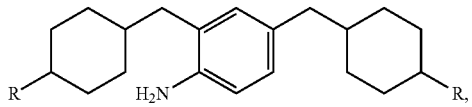

where R is $NH_2$. The second amine component is formed as a hydrogenated product of oligomeric structure in the 4,4'-Methylenedianiline process. The second amine component is formaldehyde, polymer with benzenamine, hydrogenated (MPCA, CAS #135108-88-2). The third amine component consists of at least one primary amine, at least one secondary amine, and/or at least one tertiary amine. The third amine component preferably comprises one or more amine compounds selected from the group consisting of a polyether amine, polyether diamine, a saturated aliphatic ring diamine, a linear aliphatic amine, a cycloaliphatic amine, a polycycloaliphatic amine, an aromatic amine, and combinations thereof.

In one embodiment, the first amine component comprises at least 1% by weight of the epoxy curing agent. In another embodiment, the first amine component comprises at least 10% by weight of the epoxy curing agent. In another embodiment, the first amine component comprises at least 30% by weight of the epoxy curing agent. In another embodiment, the first amine component comprises at least 50% by weight of the epoxy curing agent. In another embodiment, the first amine component comprises at least 70% by weight of the epoxy curing agent. In another embodiment, the first amine component comprises at least 90% by weight of the epoxy curing agent.

Another aspect of the invention is a composition containing the reaction product of an epoxy resin component and an amine-based curing agent component. The amine-based curing agent component has a first amine component, a second amine component, and optionally, a third amine component. The first amine component is N-(3-aminopropyl) cyclohexylamine (APCHA), represented by the formula:

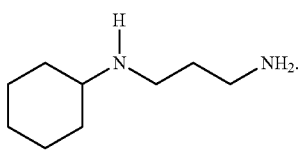

The second amine component is represented by the formula:

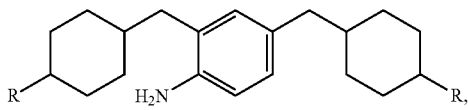

where R is $NH_2$. The second amine component is formed as a hydrogenated product of oligomeric structure in the 4,4'-Methylenedianiline process. The second amine component is formaldehyde, polymer with benzenamine, hydrogenated (MPCA, CAS #135108-88-2). The third amine component consists of at least one primary amine, at least one secondary amine, and/or at least one tertiary amine. The third amine component preferably comprises one or more amine compounds selected from the group consisting of a polyether amine, polyether diamine, a saturated aliphatic ring diamine, a linear aliphatic amine, a cycloaliphatic amine, a polycycloaliphatic amine, an aromatic amine, and combinations thereof.

In one embodiment, the first amine component comprises at least 1% by weight of the amine-based curing agent. In another embodiment, the first amine component comprises at least 10% by weight of the amine-based curing agent. In another embodiment, the first amine component comprises at least 30% by weight of the amine-based curing agent. In another embodiment, the first amine component comprises at least 50% by weight of the amine-based curing agent. In another embodiment, the first amine component comprises at least 70% by weight of the amine-based curing agent. In another embodiment, the first amine component comprises at least 90% by weight of the amine-based curing agent.

Another aspect of the invention is a method for producing a cured epoxy resin composition, comprising (a) combining an epoxy resin component with an amine-based curing agent component, the amine-based curing agent component comprising a first amine component and a second amine component; and (b) reacting the amine-based curing agent component and the epoxy resin component to form a cured epoxy resin composition. The first amine component is N-(3-aminopropyl) cyclohexylamine (APCHA), represented by the formula:

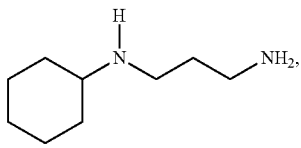 [SMILES: NCCCNC1CCCCC1]

and the second amine component is represented the formula:

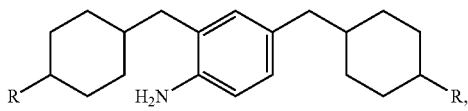

where R is $NH_2$. The second amine component is formed as a hydrogenated product of oligomeric structure in the 4,4'-Methylenedianiline process. The second amine component is formaldehyde, polymer with benzenamine, hydrogenated (MPCA, CAS #135108-88-2). In one embodiment, the first amine component comprises at least 1% by weight of the amine-based curing agent. In another embodiment, the first amine component comprises at least 10% by weight of the amine-based curing agent. In another embodiment, the first amine component comprises at least 30% by weight of the amine-based curing agent. In another embodiment, the first amine component comprises at least 50% by weight of the amine-based curing agent. In another embodiment, the first amine component comprises at least 70% by weight of the amine-based curing agent. In another embodiment, the first amine component comprises at least 90% by weight of the amine-based curing agent.

The weight ratio of the epoxy resin to N-(3-aminopropyl) (cyclohexylamine) and second amine is 1:0.05:0.95-1:0.95:0.05. In another embodiment, the weight ratio is 1:0.95:0.05. In a further embodiment, the weight ratio is 1:0.29:0.4.

The amine-based curing agent component can further comprise a third amine component. The third amine component consists of at least one primary amine, at least one secondary amine and/or at least one tertiary amine. The third amine component preferably comprises one or more amine compounds selected from the group consisting of a polyether amine, polyether diamine, a saturated aliphatic ring diamine, a linear aliphatic amine, a cycloaliphatic amine, a polycycloaliphatic amine, an aromatic amine, and combinations thereof.

The polyether amine may have the formula: $H_2NCH(CH_3)CH_2-[OCH_2CH(CH_3)]_xNH_2$, and x is from 2 to 70. The third amine may comprise a mixture of 4,4'-methylene bis cyclohexylamine, isophorone diamine, 1,2-diamino cyclohexane, 4,4'-methylenebis(2-methylcyclohexyl amine), 1,3-bis aminomethyl cyclohexane and the polyether amine: $H_2NCH(CH_3)CH_2[OCH_2CH(CH)]_{2.5}NH_2$.

A modified amine compound such as a Mannich base, a polyamide compound, an amine-epoxy adduct, and combinations thereof may be used as a co-curing agent for use with the N-(3-aminopropyl(cyclohexylamine) compound as described herein.

The epoxy resin component may comprise a polyglycidyl ether of a compound selected from the group consisting of an aliphatic glycol, a cycloaliphatic glycol, a triol, a polyol, a polyglycol, and combinations thereof. The epoxy resin system may further comprise a polyacrylate or polymethacrylate ester of a polyol.

BRIEF DESCRIPTION OF THE DRAWINGS

FIG. 1 shows the viscosity profile at 40° C. for epoxy resin compositions comprising APCHA.

DETAILED DESCRIPTION OF THE INVENTION

The epoxy resin system of the invention includes the reaction product of at least one epoxy resin component and an amine-based curing agent component comprising a first amine component and a second amine component. The first amine component is N-(3-aminopropyl) cyclohexylamine (APCHA) and the second amine component is the hydrogenated product of oligomeric structure from the 4,4'-Methylenedianiline process. The invention comprises the use of APCHA in combination with the hydrogenated product of oligomeric structure from the 4,4'-Methylenedianiline process as a curing agent for epoxy resins, especially in composite applications or ambient and heat cured coating applications.

The amine-based curing agent component can further comprise a third amine component consisting of at least one primary amine, at least one secondary amine, and/or at least one tertiary amine.

In prior art epoxy resin systems, the amine curing agent is usually added to the epoxy in such an amount that for each epoxy group in the system there is one reactive hydrogen atom in the curing agent. These are known as stoichiometric quantities. However, one aspect of the present invention is that when primary and secondary amines are used as co-curing agents with the N-(3-aminopropyl) cyclohexylamine (APCHA), the —NH bonds of the primary and/or secondary amines may be provided with stoichiometric ratios to epoxy groups≤1.

In comparison with prior art systems based on mixtures of epoxy resins with stoichiometric quantities of primary and/or secondary amines, the epoxy resin systems described herein have unexpectedly and surprisingly provided the advantages of lowered cure exothermic temperatures and heat generation with improved control on cure shrinkage, and in some cases, a more rapid cure rate under lower temperature (enabling reduced cycle times).

As used herein, the term "amine-based curing agent" means a curing agent for which amines comprise at least 80% (by weight) of the overall weight of the curing agent.

As used herein, the term "amine" or "amine compound" means any derivative of ammonia in which alkyl or aryl groups replace one or more hydrogen atoms bonded to nitrogen. The term "primary amine" or "primary amine compound" means an amine where one of the three hydrogen atoms in ammonia is replaced by an alkyl or aromatic group (a C—N bond). The term "secondary amine" or "secondary amine compound" means an amine having two alkyl or aryl groups in place of two hydrogens. The term "tertiary amine" or "tertiary amine compound" means an amine having three alkyl or aryl groups in place of three hydrogens. Any amine having more than one class of amine functional group may be categorized according to more than one class of amine (primary, secondary, or tertiary).

Referring to FIG. 1, the viscosity profile at 40° C. for epoxy resin compositions comprising 100% APCHA is compared to the viscosity profile for epoxy resin compositions comprising a combination of APCHA and the hydrogenated product of oligomeric structure from the 4,4'-Methylenedianiline process. The time (min) of reactivity of the compositions is significantly increased in the presence of APCHA.

Epoxy Resin Composition

One aspect of the invention comprises an epoxy resin composition including a reaction product of an epoxy resin component and a curing agent component comprising N-(3-aminopropyl) cyclohexylamine (APCHA), and the hydrogenated product of oligomeric structure from the 4,4'-Methylenedianiline process. Hereinafter, the portion of the curing agent consisting of N-(3-amino propyl(cyclohexylamine) is referred to as the first amine component and the portion of the curing agent consisting of the hydrogenated product of oligomeric structure from the 4,4'-Methylenedianiline process is referred to as the second amine component. The curing agent component can further comprise a third amine component consisting of one or more primary amines, one or more secondary amines, and/or one or more tertiary amines.

In the epoxy resin composition, the weight ratio of the epoxy resin component to the first amine component in the curing agent ranges from 1:0.05 to 1:0.95. In one embodiment, the range is 1:0.29. The equivalent ratio of resin to an amine is 1:0.1 to 1:0.5. The weight ratio of the epoxy resin component to the second amine component ranges from 1:0.05 to 1:0.95.

In one embodiment, the first amine component comprises at least 1% by weight of the overall weight of the curing agent. In another embodiment, the first amine component comprises at least 10% by weight of the overall weight of the curing agent. In another embodiment, the first amine component comprises at least 30% by of the overall weight of the curing agent. In another embodiment, the first amine component comprises at least 50% by weight of the overall weight of the curing agent. In another embodiment, the first amine component comprises at least 70% by weight of the overall weight of the curing agent. In another embodiment, the first amine component comprises at least 90% by weight of the overall weight of the curing agent.

In one embodiment, the epoxy component comprises 30% to 99% (by weight) of the overall weight of the epoxy resin system. In another embodiment, the epoxy component comprises 40% to 92% (by weight) of the overall weight of the epoxy resin system. In another embodiment, the epoxy component comprises 50% to 85% (by weight), of the overall weight of the epoxy resin system.

Epoxy Resin Component

The epoxy resin component can consist of a single resin, or it can be a mixture of mutually compatible epoxy resins. The epoxy resin may include, but is not limited to, bi-functional epoxies, such as, bisphenol-A and bisphenol-F resins. Multifunctional epoxy resin, as utilized herein, describes compounds containing two or more 1,2-epoxy groups per molecule. Epoxide compounds of this type are well known to those of skill in the art and are described in Y. Tanaka, "Synthesis and Characteristics of Epoxides", in C. A. May, ed., *Epoxy Resins Chemistry and Technology* (Marcel Dekker, 1988), which is incorporated herein by reference in its entirety.

One class of epoxy resins suitable for use in the epoxy resin component comprises the glycidyl ethers of polyhydric phenols, including the glycidyl ethers of dihydric phenols. Illustrative examples include, but are not limited to, the glycidyl ethers of: resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane (commercially known as bisphenol A), bis-(4-hydroxyphenyl)-methane (commercially known as bisphenol-F, and which may contain varying amounts of 2-hydroxyphenyl isomers), and the like, or any combination thereof. Additionally, advanced dihydric phenols of the structure of formula (1) also are useful in the present disclosure:

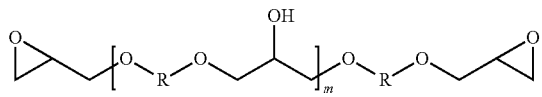

(1)

where m is 0 to 25, and R is a divalent hydrocarbon radical of a dihydric phenol, such as those dihydric phenols listed above.

Materials according to formula (1) can be prepared by polymerizing mixtures of a dihydric phenol and epichlorohydrin, or by advancing a mixture of a diglycidyl ether of the dihydric phenol and the dihydric phenol. While in any given molecule the value of m is an integer, the materials are invariably mixtures which can be characterized by an average value of m which is not necessarily a whole number. Polymeric materials with an average value of m between 0 and about 7 can be used in one aspect of the present disclosure. In other embodiments, the epoxy component may be a polyglycidyl amine from one or more of 2,2'-methylene dianiline, 4,4'-methylene dianiline, m-xylene dianiline, hydantoin, and isocyanate.

The epoxy resin component may be a cycloaliphatic (alicyclic) epoxide. Examples of suitable cycloaliphatic epoxides include diepoxides of cycloaliphatic esters of dicarboxylic acids such as bis(3,4-epoxycyclohexylmethyl) oxalate, bis(3,4-epoxycyclohexylmethyl)adipate, bis(3,4-epoxy-6-methylcyclohexylmethyl)adipate, vinylcyclohexene diepoxides; limonene diepoxide; bis(3,4-epoxycyclohexylmethyl)pimelate; dicyclopentadiene diepoxide; and other suitable cycloaliphatic epoxides. Other suitable diepoxides of cycloaliphatic esters of dicarboxylic acids are described, for example, in Patent Application Publication No. WO 2009/089145 A1, which is hereby incorporated by reference in its entirety.

Other cycloaliphatic epoxides include 3,3-epoxycyclohexylmethyl-3,4-epoxycyclohexane carboxylate such as 3,4-epoxycyclohexylmethyl-3,4-epoxycyclohexane carboxylate; 3,3-epoxy-1-methylcyclohexyl-methyl-3,4-epoxy-1-methylcyclohexane carboxylate; 6-methyl-3,4-epoxycyclohexylmethylmethyl-6-methyl-3,4-epoxycyclohexane carboxylate; 3,4-epoxy-2-methylcyclohexyl-methyl-3,4-epoxy-3-methylcyclohexane carboxylate. Other suitable 3,4-epoxycyclohexylmentyl-3, 4-epoxycyclohexane carboxylates are described, for example, in U.S. Pat. No. 2,890,194, which is hereby incorporated by reference in its entirety. In other embodiments, the epoxy component may include polyol polyglycidyl ether from polyethylene glycol, polypropylene glycol or polytetrahydrofuran or combinations thereof.

In another aspect, epoxy novolac resins, which are the glycidyl ethers of novolac resins, can be used as multifunctional epoxy resins in accordance with the present disclosure. In yet another aspect, the at least one multifunctional epoxy resin is a diglycidyl ether of bisphenol-A (DGEBA), an advanced or higher molecular weight version of DGEBA, a diglycidyl ether of bisphenol-F, an epoxy novolac resin, or any combination thereof. Higher molecular weight versions or derivatives of DGEBA are prepared by the advancement process, where excess DGEBA is reacted with bisphenol-A to yield epoxy terminated products. The epoxy equivalent weights (EEW) for such products range from about 450 to 3000 or more. Because these products are solid at room temperature, they are often referred to as solid epoxy resins.

DGEBA or advanced DGEBA resins are often used for structural formulations due to a combination of their low cost and generally high performance properties. Commercial grades of DGEBA having an EEW ranging from about 174 to about 250, and more commonly from about 185 to about 195, are readily available. At these low molecular weights, the epoxy resins are liquids and are often referred to as liquid epoxy resins. It is understood by those skilled in the art that most grades of liquid epoxy resin are slightly polymeric, since pure DGEBA has an EEW of 174. Resins with EEWs between 250 and 450, also generally prepared by the advancement process, are referred to as semi-solid epoxy resins because they are a mixture of solid and liquid at room temperature. Generally, multifunctional resins with EEWs based on solids of about 160 to about 750 are useful in the present disclosure. In another aspect, the multifunctional epoxy resin has an EEW in a range from about 170 to about 250.

Depending upon the end-use application, it can be beneficial to reduce the viscosity of the compositions of the present disclosure by modifying the epoxy resin component. The epoxy resin component, which comprises at least one multifunctional epoxy resin, further comprises a monofunctional epoxide. Examples of monospoxides include, but are not limited to, styrene oxide, cyclohexene oxide and the glycidyl ethers of phenol, cresols, tert-butylphenol, other alkyl phenols, butanol, 2-ethylhexanol, $C_4$ to $C_4$ alcohols, and the like, or combinations thereof. The multifunctional epoxy resin can also be present in a solution or emulsion, with the diluent being water, an organic solvent, or a mixture thereof.

Curing Agent Component

As noted above, the curing agent component is an amine-based curing agent having a first amine component and a second amine component. The first amine component consists of N-(3-aminopropyl) cyclohexylamine (APCHA). The second amine component consists of the hydrogenated product of oligomeric structure from the 4,4'-Methylenedianiline process. The curing agent component can further comprise a third amine component consisting of at least one primary amine, at least one secondary amine, and/or at least one tertiary amine.

First Amine Component

The first amine component is N-(3-aminopropyl) cyclohexylamine (APCHA), represented by the formula:

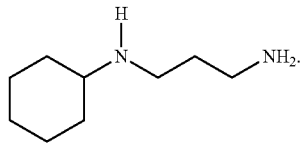 [SMILES: NCCCNC1CCCCC1]

Second Amine Component

The second amine component is the hydrogenated product of oligomeric structure from the 4,4'-Methyleneaniline process, represented by the formula:

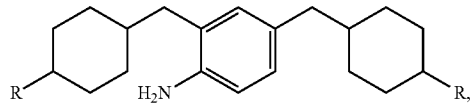

where R is $NH_2$.

Third Amine Component

The third amine component can consist of a single amine or a mixture of amines. The amines in the third amine component are primary, secondary, and/or tertiary amines.

In some applications, the following are suitable as the third amine component: a polyether diamine, a saturated aliphatic ring diamine, a linear aliphatic amine, a cycloaliphatic amine, a polycycloaliphatic amine, an aromatic amine, and combinations thereof. The weight ratio of the epoxy resin to N-(3-aminopropyl(cyclohexylamine) and second amine is 1:0.05:0.95-1:0.95:0.05. In another embodiment, the weight ratio is 1:0.4:0.6. In another embodiment, the weight ratio is 1:0.29:0.4. Polyamines selected from one or more of an aliphatic polyamine such as diethylenetriamine (DETA), triethylenetetramine (TETA), tetraethylenepentamine (TEPA), pentaethylenehexamine (PEHA), hexamethylenediamine (HMDA), N-(2-aminoethyl)-1,3-propanediamine (N-Amine), N, N'-1,2-ethanediylbis-1,3-propanediamine ($N_4$-amine), or dipropylenetriamine; an arylaliphatic polyamine such as m-xylylenediamine (mXDA), or p-xylylenediamine; a cycloaliphatic polyamine such as 1,3-bis aminomethyl cyclohexane (1,3-BAC), isophorone diamine (IPDA), 4,4'-methylene bis cyclohexylamine (PACM), 1,2-diamino cyclohexane, or 4,4'-methylenebis-(2-methyl-cyclohexyl-amine); an aromatic polyamine such as m-phenylenediamine, diaminodiphenylmethane (DDM), or diaminodiphenylsulfone (DDS); a heterocyclic polyamine such as N-aminoethylpiperazine (NAEP), or 3,9-bis(3-aminopropyl)2,4,8,10-tetraoxaspiro (5,5)undecane; a polyalkoxypolyamine where the alkoxy group can be an oxyethylene, oxypropylene, oxy-1,2-butylene, oxy-1,4-butylene or co-polymers thereof such as 4,7-dioxadecane-1,10-diamine, 1-propanamine, 3,3'-(oxybis(2,1-ethanediyloxy)) bis(diaminopropylated diethylene glycol ANCAMINE® 1922A), poly(oxy(methyl-1,2-ethanediyl)), alpha-(2-aminomethylethyl) omega-(2-aminomethylethoxy) (JEFFAMINE® D 230, D-400), triethyleneglycoldiamine and oligomers (JEFFAMINE® XTJ-504, JEFFAMINE® XTJ-512), poly(oxy(methyl-1,2-ethanediyl)), alpha,alpha'-(oxydi-2,1-ethanediyl)bis(omega-(aminomethylethoxy)) (JEFFAMINE® XTJ-511), bis(3-aminopropyl)polytetrahydrofuran 350, bis(3-aminopropyl)polytetrahydrofuran 750, poly(oxy(methyl-1,2-ethanediyl), a-hydro-w-(2-aminomethylethoxy)ether with 2-ethyl-2-(hydroxymethyl)-1,3-propanediol (3:1) (JEFFAMINE® T-403), and diaminopropyl dipropylene glycol. JEFFAMINE® is a registered trademark of Huntsman Petrochemical LLC.

Particularly suitable polyamines include isophoronediamine (IPDA), 4,4'-methylene bis cyclohexylamine (PACM), 3,3'-dimethyl PACM (ANCAMINE® 2049), N-aminoethylpiperazine (NAEP), 4,7-dioxadecane-1,10-diamine,1-propanamine,3,3'-(oxybis(2,1-ethanediyloxy))bis-(ANCAMINE® 1922A), poly(oxy(methyl-1,2-ethanediyl)), alpha-(2-aminomethylethyl)omega-(2-aminomethylethoxy) (JEFFAMINE® D 230, D-400), poly(propylene glycol) bis (2-aminopropyl ether), triethylene glycol diamine (JEFFAMINE® XTJ-504), and poly(oxy(methyl-1,2-ethanediyl))alpha,alpha'-(oxy(di-2,1-ethanediyl))bis(omega-(aminomethylethoxy)) (JEFFAMINE® XTJ-511) or mixture thereof. ANCAMINE® is a registered trademark of Evonik Degussa GmbH.

Suitable tertiary amines include N-hydroxyethylpiperidine, N-hydroxypropylpiperidine, 2-methyl-N-hydroxyethylpiperidine, N-hydroxymethylpiperidine, N-hydroxyethylmorpholine, 1,4-bis(2-hydroxyethyl)piperazine, 1,4-dimethylpiperazine, N-cyclohexyl-N,N-dimethylamine, N-cyclohexyl-N,N-diethylamine, N-cyclohexyl-N-ethyl-N-methylamine, N,N-dimethyl-N-(2-methylcyclohexyl)amine, N,N-dicyclohexyl-N-methylamine, N-hydroxyethyl-N-cyclohexyl-N-methylamine, N-cyclohexyl-N,N-dipropylamine, N-cyclohexyl-N,N-dioctylamine, benzyldimethylamine (BDMA), tris(dimethylaminomethyl)phenol (DMP-30, K54), TEDA, N,N-dimethylpiperazine, 2-(dimethylaminomethyl)phenol, and combinations thereof.

Additional amines suitable for forming the third amine component are polyamines comprising at least one or more multifunctional amine of structure (3).

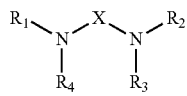

where $R_1$ is $CH_2CH_2CH_2NH_2$; $R_2$, R and $R_4$ independently are H or $CH_2CH_2CH_2NH_2$; and X is $CH_2CH_2$ or $CH_2CH_2CH_2$. In one embodiment $R_2$ and $R_3$ are not H simultaneously.

Optional Additives

The epoxy system formulation for the composite may optionally include additives, such as, but not limited to, non-reactive plasticizer(s), filler(s), processing aid(s), stabilizer, air release agent, viscosity modifier(s), UV absorbent agent, a flame retardant, and/or an impact modifier.

The optional acrylate or methacrylate esters of the polyols are blended with the epoxy resin component in a weight ratio of from 0 to up to about 100 parts of ester for each 100 parts of epoxy resin component. In another embodiment, the acrylate or methacrylate esters of the polyols are blended with the epoxy resin component in a weight ratio of about 5 to about 100 parts of ester for each 100 parts of epoxy resin component.

Nano materials/fillers may be included. The term "nanomaterials," includes, but is not limited to, multi-wall carbon or boron nitride nanotubes, single-wall carbon, carbon or boron nitride nanoparticles, carbon or boron nitride nanofibers, carbon or boron nitride nanoropes, carbon or boron nitride nano ribbons, nanoclays; nanoclays comprising tubules; layered inorganic clay material; talc; carbon black; cellulose fibers; silica; and alumina.

Reinforcing fibers may also be included in the epoxy resin system. Suitable fibers include organic or inorganic fibers, natural fibers or synthetic fibers, and may be present in the form of wovens or non-crimp fabrics, nonwovens webs or mats, and also in the form of fiber stands (rovings), or staple fiber formed of continuous or discontinuous fiber such as fiber glass, carbon fiber, carbon nanotubes, nano composite fibers, polyaramide fibers such as those sold under the trade name KEVLAR®, Poly(p-phenylene benzobisoxazole) fiber such as those sold under the trade name ZYLON®, ultrahigh molecular weight polyethylene fibers such as those sold under the trade name SPECTRA®, high and low density polyethylene fibers, polypropylene fibers, nylon fibers, cellulose fibers, natural fibers, biodegradable fibers and combinations thereof.

These fibers (woven or non-woven) can be coated with the solvent or solvent free epoxy resin mixture by the standard impregnating methods, in particular for filament winding (FW), pultrusion, sheet molding compound, bulk molding compound autoclave molding, resin infusion, vacuum assisted resin transfer molding (VARTM), resin transfer molding (RTM), wet/hand lay-up, vacuum bagging, resin impregnation, prepreg, fiber impregnation, compression molding (CM), brushing, spraying, or dipping, casting, injection molding or combination thereof.

Forming a Cured Epoxy Composition

Mixing of the curing agent component and the epoxy component to form the epoxy resin composition can be in any order and by any appropriate means known in the art for two component epoxy compositions. The mixing may be accomplished according to any known method for mixing, including, but not limited to, mixing by magnetic stirrers, high shear mixing, hand mixing, mechanical mixing or other suitable mixing method. The mixing of the curing component is preferably carried out at a temperature in the range of 0 to 150° C., preferably 30 to 60° C.

The curable epoxy resin compositions and cured products described herein may be useful as structural and electrical laminates, coating, casting, structural components for aerospace industries, and as circuit boards and the like for the electronics industry, among other applications. The curable epoxy resin compositions disclosed herein may also be used in electrical varnishes, encapsulants, semiconductors, general molding powders, filament wound pipes and fittings, filament wound pressure vessels, low and high pressure pipes and fittings, low and high pressure vessels, storage tanks, wind turbine blades, automotive structural parts, aerospace structural parts, oil and gas buoyance modules, rigs, well plugs, cured-in-place-pipe (CIPP), structural bonding adhesives and laminates, a composite liner, liners for pumps, corrosion resistant coatings, and other suitable epoxy containing products.

The curable epoxy resin composition may be used to form composite materials on a reinforced fiber substrate. The reinforced fiber substrate may be one or more layers of fiberglass material. Contacting the reinforcing fiber substrate with the epoxy resin system may comprise an application process selected from the group consisting of including hand lamination, an infusion process, filament winding, pultrusion, resin transfer molding, fiber pre-impregnation processes, and combinations thereof.

In an embodiment, a method for producing the cured epoxy resin composition comprises (a) combining an epoxy resin component with an amine-based curing agent component, the amine-based curing agent component comprising a first amine component represented by the structure:

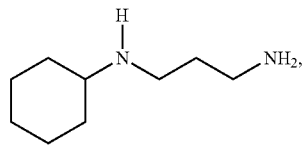 [SMILES: NCCCNC1CCCCC1]

and a second amine component represented by the structure:

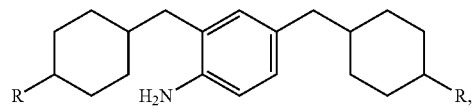

where R is $NH_2$;
and (b) reacting the at least one amine compound and the epoxy resin to form a cured epoxy resin composition. The method steps (a) and (b) may be performed in an oven at a first ambient temperature and a maximum internal temperature during steps (a) and (b) maintained that is no more than 175° C. above the first ambient temperature. The first ambient temperature is 25° C. The maximum internal temperature is no more than 200° C. The amine-based curing agent component can further comprise a third amine component consisting of primary, secondary, and/or tertiary amines. In one embodiment, the first amine component comprises at least 1% by weight of the amine-based curing agent. In another embodiment, the first amine component comprises at least 10% by weight of the amine-based curing agent. In another embodiment, the first amine component comprises at least 30% by weight of the amine-based curing agent. In another embodiment, the first amine component comprises at least 50% by weight of the amine-based curing agent. In another embodiment, the first amine component comprises at least 70% by weight of the amine-based curing agent. In another embodiment, the first amine component comprises at least 90% by weight of the amine-based curing agent.

When cured, the reaction product of the epoxy resin component and the curing agent component may exhibit a $T_g$ of 70° C. or greater at a cure time of less than 2 hours as measured by Differential Scanning Calorimetry (DSC). The glass transition temperature ($T_g$) was measured using DSC of the epoxide-based composition cured at 100° C. for 2 hours according to the present invention. 20 mg of the cured composition was carefully measured in an aluminum pan and sealed with the lid. A sample of this cured composition was analyzed by DSC (TA Instruments QA20) using a program that starts at 25° C. and heats at 10° C./minute up to 250° C., cools and scans a second time to 250° C. The first scan provides residual peak exotherm if any and heat of reaction, while the second scan confirms the glass transition temperature. When curing, the reaction product of the epoxy resin component and the curing agent may exhibit a maximum exothermic temperature of below 50° C. or lower for a 100 gram mass in an oven at 70° C.

The product formed from the epoxy resin component and the curing agent may exhibit a maximum exothermic temperature of 50° C. or lower during formation. The product may further include a reinforcing fiber substrate. The product may be in the form of various structural parts. The product may exhibit a flexural strength of greater than 70 MPa with a strain of 2% or greater and transverse tensile modulus of greater than 40 GPa, an in-plane inter-laminar shear strength of greater than 40 MPa.

The following invention is directed to the following aspects:

<1> A method for producing a cured epoxy resin composition, comprising:
(a) combining an epoxy resin component with an amine-based curing agent component, the amine-based curing agent component comprising a first amine component represented by the structure:

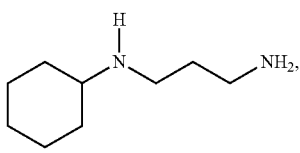 [SMILES: NCCCNC1CCCCC1]

and a second amine component represented by the structure:

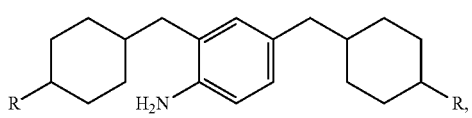

wherein R is NH$_2$; and
(b) reacting the amine-based curing agent component and the epoxy resin component to form a cured epoxy resin composition.

<2> A preferred method of aspect <1> wherein the first amine component comprises at least 1% by weight of the amine-based curing agent.

<3> A preferred method of aspect <1> further comprising a third amine component having at least one amine compound selected from the group of a primary amine, a secondary amine, and a tertiary amine.

<4> A preferred method of aspect <3> wherein the third amine component comprises at least one polyether amine, polyether diamine, a saturated aliphatic ring diamine, a linear aliphatic amine, a cycloaliphatic amine, a polycycloaliphatic amine, an aromatic amine, and combinations thereof.

<5> A preferred method of aspect <1> further comprising:
performing steps (a) and (b) at a first ambient temperature; and maintaining a maximum internal temperature during steps (a) and (b) that is no more than 175° C. above the first ambient temperature.

<6> A preferred method of aspect <1> further comprising: applying the epoxy resin composition to a reinforcing fiber prior to step (b).

<7> A preferred method of aspect <6> wherein the reinforcing fiber is selected from the group consisting of woven or non-crimp fabrics, nonwoven webs or mats, fiber stands, staple fiber formed of continuous or discontinuous fiber, and combinations thereof.

<8> A preferred method of aspect <6> wherein the reinforcing fiber is selected from the group consisting of fiberglass, carbon fiber, carbon nanotubes, nano composite fibers, polyaramide fibers, poly(p-phenylene benzobisoxazole) fiber, Aramid Kevlar fiber, ultrahigh molecular weight polyethylene fiber, high and low density polyethylene fibers, polypropylene fibers, nylon fibers, cellulose fibers, natural fibers, biodegradable fibers, and combinations thereof.

<9> A preferred method of aspect <8> wherein the epoxy resin composition is made from a process selected from the group consisting of resin infusion, vacuum misted resin transfer molding (VARTM), resin transfer molding (RTM), filament winding (FW), compression molding (CM), wet/hand lay-up, vacuum bagging, injection molding, prepreg, fiber impregnation, casting, and combinations thereof.

<10> An epoxy curing agent comprising a first amine component represented by the structure:

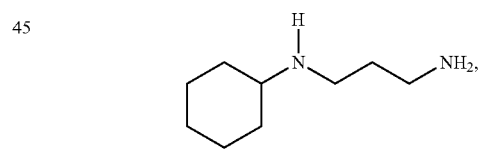

and a second amine component represented by the structure:

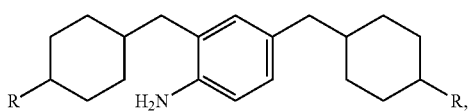

wherein R is NH$_2$.

<11> A preferred epoxy curing agent of aspect <10> wherein the first amine component comprises at least 1% by weight of the epoxy curing agent.

<12> A preferred epoxy curing agent of aspect <10> further comprising a third amine component having at least one amine compound selected from the group of a primary amine, a secondary amine, and a tertiary amine.

<13> A preferred epoxy curing agent of aspect <12> wherein the third amine component comprises at least one polyether amine, polyether diamine, a saturated aliphatic ring diamine, a linear aliphatic amine, a cycloaliphatic amine, a polycycloaliphatic amine, an aromatic amine, and combinations thereof.

<14> A composition comprising the reaction product of an epoxy resin component; and an amine-based curing agent component, wherein the amine-based curing agent component comprises a first amine component represented by the structure:

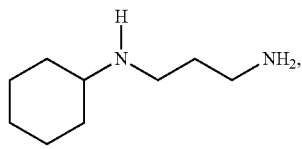 [SMILES: NCCCNC1CCCCC1]

and a second amine component represented by the structure:

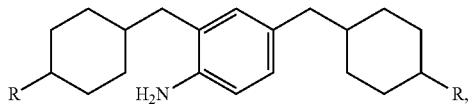

wherein R is $NH_2$.

<15> A preferred composition of aspect <14> wherein the first amine component comprises at least 1% by weight of the amine-based curing agent.

<16> A preferred composition of aspect <14> further comprising a third amine component having at least one amine compound selected from the group of a primary amine, a secondary amine, and a tertiary amine.

<17> A preferred composition of aspect <16> wherein the third amine component comprises at least one polyether amine, polyether diamine, a saturated aliphatic ring diamine, a linear aliphatic amine, a cycloaliphatic amine, a polycycloaliphatic amine, an aromatic amine, and combinations thereof.

<18> A preferred composition of aspect <14> wherein the epoxy resin component comprises about 1% to about 99% by weight of the composition.

<19> A preferred composition of aspect <14> wherein the epoxy resin component comprises a glycidyl ether of polyhydric phenol.

<20> A preferred composition of aspect <14> wherein the epoxy resin composition comprises at least one glycidyl ether selected from the group of glycidyl ethers of resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane, bis-(4-hydroxyphenyl)-methane, novolac resins, and combinations thereof.

<21> A preferred composition of aspect <14> wherein the epoxy resin component comprises at least one dihydric phenol of the following structure:

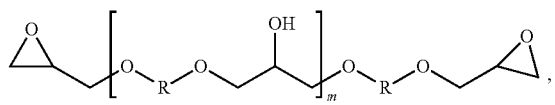

wherein m is 0 to 25 and R is a divalent hydrocarbon radical.

<22> A preferred composition of aspect <14 wherein the epoxy resin component comprises at least one member selected from the group of bis(3,4-epoxycyclohexylmethyl) oxalate, bis(3,4-epoxycyclohexylmethyl)adipate, bis(3,4-epoxy-6-methylcyclohexylmethyl)adipate, vinylcyclohexene diepoxides; limonene diepoxide; bis(3,4-epoxycyclohexylmethyl)pimelate; dicyclopentadiene diepoxide, 3,3-epoxycyclohexylmethyl-3,4-epoxycyclohexane carboxylate such as 3,4-epoxycyclohexylmethyl-3,4-epoxycyclohexane carboxylate; 3,3-epoxy-1-methylcyclohexyl-methyl-3,4-epoxy-1-methylcyclohexane carboxylate; 6-methyl-3,4-epoxycyclohexylmethylmethyl-6-methyl-3,4-epoxycyclohexane carboxylate; 3,4-epoxy-2-methylcyclohexyl-methyl-3,4-epoxy-3-methylcyclohexane carboxylate, and combinations thereof.

<23> Use of the composition of aspect <14, optionally in combination with reinforcing fiber, for the production of filament wound pipes and fittings, filament wound pressure vessels, low and high pressure pipes and fittings, low and high pressure vessels, storage tanks, wind turbine blades, automotive structural parts, aerospace structural parts, oil and gas buoyance modules, rigs, well plugs, cure-in-place-pipe (CIPP), structural bonding adhesives and laminates, encapsulants, semiconductors, corrosion resistance coatings, a composite liner and other suitable epoxy containing applications.

EXAMPLES

These Examples are provided to demonstrate certain aspects of the invention and shall not limit the scope of the claims appended hereto.

Example 1

This example describes the preparation and testing of curing agent blends.

The N-cyclohexyl-1,3-propane diamine (APCHA) is mixed with the hydrogenated product of oligomeric structure from the 4,4'-Methylenedianiline process (MPCA, CAS #135108-88-2) to make the liquid curing component.

TABLE 1

| Blend | Hydrogenated product of oligomeric structure from the 4,4'-Methylene-dianiline process (MPCA) | N-cyclohexyl-1,3-propane diamine (APCHA) | Amine Blend Viscosity @ 25° C. (cPs) | Amine Blend Viscosity @ 40° C. (cPs) |
|---|---|---|---|---|
| 1 | 100% | 0 | Semi-Solid | >100,000 |
| 2 | 90% | 10% | 13,679 | 1,600 |
| 3 | 80% | 20% | 2,135 | 409 |
| 4 | 70% | 30% | 459 | 128 |
| 5 | 60% | 40% | 184 | 62 |
| 6 | 50% | 50% | 81 | 31 |
| 7 | 40% | 60% | 40 | 20 |
| 8 | 30% | 70% | 24 | 12 |
| 9 | 20% | 80% | 15 | 10 |
| 10 | 10% | 90% | 10 | 6 |
| 11 | 0% | 100% | 7 | 5 |

In Table 1, the hydrogenated product of oligomeric structure from the 4,4'-methylenedianiline process (MPCA) was mixed with N-cyclohexyl-1,3-propane diamine (APCHA) at different ratios to determine their efficiency to lower the viscosity. It is desirable to use formulated curing agents in a liquid form for composite applications. The hydrogenated product of oligomeric structure from the 4,4'-methylenedianiline process (MPCA) are either semi-solid at 25° C. or high viscosity at 40° C. The N-cyclohexyl-1,3-propane diamine (APCHA) was found to be a very effective reactive solvent at very low loading (10%) that significantly reduced the viscosity of the hydrogenated product of oligomeric structure from the 4,4'-methylenediamine process (MPCA). The reactivity of N-cyclohexyl-1,3-propane with epoxy resin maintained the physical, thermal and chemical properties desired for composite applications.

Example 2

This example describes the preparation of epoxy curing agent blends and testing of cured epoxy resin formulations.

TABLE 2

| Epoxy curing agent | Hydrogenated product of oligomeric structure from the 4,4'-Methylenedianiline process | N-cyclohexyl-1,3-propane diamine | Mixed Viscosity with Epoxy (EEW190) @ 40° C. (cPs) |
|---|---|---|---|
| 1 | 100% | 0% | >100,000 |
| 2 | 0% | 100% | 183 |
| 3 | 70% | 30% | 1,000 |
| 4 | 50% | 50% | 333 |
| 5 | 30% | 70% | 267 |

Several curing agent formulations were prepared. The hydrogenated product of oligomeric structure from the 4,4'-Methylenedianiline process (MPCA) was mixed with N-cyclohexyl-1,3-propane diamine (APCHA) at different ratios to make curing agents for epoxy resin. Both products were mixed in the amounts shown in Table 2. To facilitate mixing, both the hydrogenated product of oligomeric structure from the 4,4'-Methylenedianiline process (MPCA) and the N-cyclohexyl-1,3-propane diamine (APCHA) were preheated separately at 50° C. for 1 hour. Curing agents 3-5 were mixed with magnetic stirrer at 1000 rpm at 50° C. for 1 hour. Resulting curing agents were used to cure epoxy resin (epoxy equivalent weight (EEW) 180) at varied stoichiometric ratios shown in Table 3. The liquid epoxy resin (LER) (EEW180) EPON®828. EPON® is a registered trademark of Hexion Specialty Chemicals, Inc.

The viscosity of all formulations shown in Tables 2 and 3 were measured at 40° C. using Brookfield viscometer RV with spindle number 27. 12 grams of epoxy resin composition were used to measure the viscosity.

The reactivity of all formulations shown in FIG. 1 were measured at 40° C. using Brookfield viscometer RV with spindle number 27. 12 grams of epoxy resin composition were used to measure the reactivity.

FIG. 1 shows formulations 2-5 listed in Tables 2 and 3. The formulation 1 reactivity study was not performed due to its higher viscosity and difficulty getting a homogeneous mixture. Based on the reactivity study shown in FIG. 1, it is possible to use up to 70% of the hydrogenated product of oligomeric structure from the 4,4'-methylenedianiline process (MPCA), when used with N-cyclohexyl-1,3-propane diamine (APCHA) and Epon 826. Typically for composite applications, lower than 1,500 cPs viscosity is acceptable to adequately process the composite parts.

TABLE 3

| Formulation | 1* | 2 | 3 | 4 | 5 |
|---|---|---|---|---|---|
| Hydrogenated product of oligomeric structure from the 4,4'-Methylenedianiline process | 100 | — | 70 | 50 | 30 |
| N-cyclohexyl-1,3-propane diamine | | 100 | 30 | 50 | 70 |
| LER EEW-180 | | 100 | 100 | 100 | 100 |
| Phr used | | 29 | 29 | 29 | 29 |
| Mix Viscosity @ 40° C. with EEW180 | | 183 | 1,000 | 333 | 267 |
| Tg C (ISO) 2 hrs @ 100° C. $1^{st}$ scan/$2^{nd}$ scan up to 250° C. | | 94/95 | 109/125 | 110/114 | 93/96 |
| Time to 10,000 cps @ 40° C. | | 107 | 79 | 79 | 102 |
| Mix vis @40° C. with EEW180 | | 183 | 1,000 | 333 | 267 |
| Mechanical Properties | | | | | |
| Tensile Strength(psi) | | 9,725 | 8,233 | 9,736 | 9,235 |
| Tensile Modulus (psi) | | 298,000 | 327,000 | 318,000 | 310,000 |
| % Elongation at Break | | 8.1 | 5.5 | 5.2 | 6.3 |
| Flexural Strength (psi) | | 16,892 | 15,758 | 17,950 | 15,926 |
| Flexural Modulus(psi) | | 382,000 | 414,000 | 401,000 | 415,000 |
| Comp Strength (psi) | | 11,693 | 16,808 | 19,183 | 17,246 |
| Comp Modulus (psi) | | 270,000 | 262,093 | 256,000 | 250,453 |

*Not performed due to the solid form of Hydrogenated product of oligomeric structure from the 4,4'-Methylenedianiline process it was difficult to get homogeneous mixing with epoxy resin.

The epoxy component and amine curatives shown in Table 3 were hand mixed at 40° C. for 3-5 minutes. Entrapped air was removed by placing the mixture in a centrifuge for 5 minutes or until the mixture was clear. The mixture was then poured into a ⅛" aluminum mold. The system in the mold was cured at 80° C. for 2 hours plus 150° C. for 3 hours. Molds were allowed to cool to room temperature before removing the cured sample. Specimens were prepared from the cast samples according to ASTM methods to perform the mechanical testing; tensile test (ASTM D638), flexural test (ASTM D790), and compressive test (ASTM D695). Additional 1"×3"×⅛" samples were prepared to perform chemical resistance testing in different reagents.

The reactivity of all formulations shown in Table 3 were measured at 40° C. using Brookfield viscometer RV with spindle number 27. 12 grams of epoxy resin composition were used to measure the reactivity.

A TECHNE® gel timer was used to measure the gel time of all the formulations shown in Table 3. The one end of the metal rod was connected to the TECHNE® gel timer and another end with the 1" diameter dish. The epoxy component and curing agents were preheated separately at 25° C. A total of 150 grams of mixture (epoxy component and curing components) was mixed for 3-5 minutes. The 1" diameter dish was immersed into the beaker content mixture and Gel time was turned ON immediately to obtain an accurate reading.

The results for formulations 2-5 are reported in Table 3. Formulations 2, 4 and 5, according to the present disclosure, give similar initial viscosity<350 cPs. However, formulations 2 and 5 have a pot life ~100 mins (time to 10,000 cPs) and formulations 3 and 4 have a pot life ~80 mins. Formulations 3 & 4 provide a Tg in the range of 110 C-125 C and formulations 2 & 5 provides a Tg in the range of 90 C-95 C. The presence of N-cyclohexyl-1,3-propane diamine in the formulation gives very high elongation and the addition of hydrogenated product of oligomeric structure from the 4,4'-Methylenedianiline process improves the modulus of the cured formulations.

Example 3

This example describes the testing of cured epoxy resin formulations after chemical immersion.

TABLE 4

| Formulation | 1* | 2 | 3 | 4 | 5 |
|---|---|---|---|---|---|
| Hydrogenated product of oligomeric structure from the 4,4'-Methylene-dianiline process | 100 | — | 70 | 50 | 30 |
| N-cyclohexyl-1,3-propane diamine | | 100 | 30 | 50 | 70 |
| LER EEW-180 | | 100 | 100 | 100 | 100 |
| Phr used | | 29 | 29 | 29 | 29 |
| Flexural Modulus retention after Chemical immersion | | | | | |
| Flexural Modulus (psi) | | | | | |
| No exposure | | 383,000 | 415,000 | 402,000 | 416,000 |
| After 30 days in Acetone @ 25 C. (psi) | Fractured | 344,000 | 350,000 | 346,000 | |
| After 30 days in Methanol @ 25 C. (psi) | Fractured | 376,000 | 323,000 | 367,000 | |

*Not performed due to the solid form of Hydrogenated product of oligomeric structure from the 4,4'-Methylenedianiline process it was difficult to get homogeneous mixing with epoxy resin The neat cast panels for formulations 2-5 were prepared using the process described in Example 2. The flexural specimens (½"×3"×⅛") were machined according to ASTM D790. The specimens were immersed into different reagents for 30 days @ 25° C. to understand the flexural modulus retention before and after immersion. The reagents used were; water, acetone, toluene, methanol, ethanol, 25% acetic acid, 10% nitric acid, and 10% ammonium hydroxide. The flexural modulus of formulation 2 was retained in most of the reagents except specimens that were fractured in either acetone or methanol. These reagents are considered as very aggressive for attaching an epoxy crosslinked network. In formulations 3-5 the incorporation of hydrogenated product of oligomeric structure from the 4,4'-Methylenedianiline into N-cyclohexyl-1,3-propane diamine improves the flexural modulus in these formulations. The flexural modulus in these formulations were regained by having unique amines combinations.

What is claimed is:

1. A method for producing a cured epoxy resin composition, consisting of:
    (a) combining an epoxy resin component with an amine-based curing agent component, the amine-based curing agent component consisting of a first amine component represented by the structure:

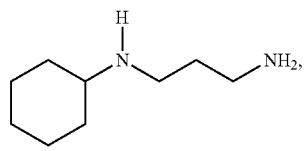

a second amine component represented by the structure:

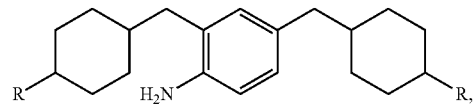

wherein R is NH₂, and a third amine component having at least one amine compound selected from the group of a primary amine, a secondary amine, and a tertiary amine; to form an epoxy resin composition;
    wherein the third amine component is selected from the group consisting of polyether amine, polyether diamine, a saturated aliphatic ring diamine, a linear aliphatic amine, a cycloaliphatic amine, a polycycloaliphatic amine, a polyamide, and combinations thereof;
    wherein the first amine component comprises at least 30% by weight of the amine-based curing agent component; and
    (b) reacting the amine-based curing agent component and the epoxy resin component to form a cured epoxy resin composition.

2. The method of claim 1, further consisting of performing steps (a) and (b) at a first ambient temperature; and
maintaining a maximum internal temperature during steps (a) and (b) that is no more than 175° C. above the first ambient temperature.

3. An epoxy curing agent consisting of a first amine component represented by the structure:

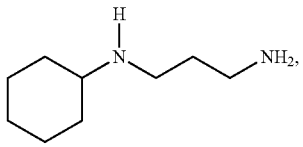 [SMILES: NCCCNC1CCCCC1]

a second amine component represented by the structure:

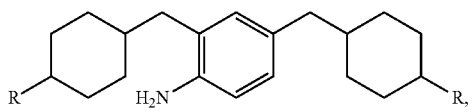

wherein R is NH₂, and a third amine component having at least one amine compound selected from the group of a primary amine, a secondary amine, and a tertiary amine; wherein the third amine component is selected from the group consisting of polyether amine, polyether diamine, a saturated aliphatic ring diamine, a linear aliphatic amine, a cycloaliphatic amine, a polycycloaliphatic amine, a polyamide, and combinations thereof; wherein the first amine component comprises at least 30% by weight of the epoxy curing agent.

4. A composition consisting of the reaction product of:
an epoxy resin component;
an amine-based curing agent component, wherein the amine-based curing agent component consists of a first amine component represented by the structure:

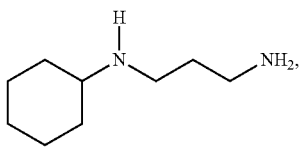 [SMILES: NCCCNC1CCCCC1]

a second amine component represented by the structure:

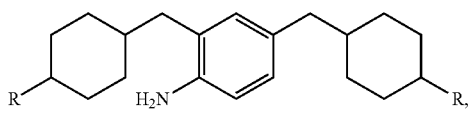

wherein R is NH₂; and a third amine component having at least one amine compound selected from the group of a primary amine, a secondary amine, and a tertiary amine; wherein the third amine component is selected from the group consisting of polyether amine, polyether diamine, a saturated aliphatic ring diamine, a linear aliphatic amine, a cycloaliphatic amine, a polycycloaliphatic amine, a polyamide, and combinations thereof; wherein the first amine component comprises at least 30% by weight of the amine-based curing agent component.

5. The composition of claim 4, wherein the epoxy resin component consists of a glycidyl ether of polyhydric phenol.

6. The composition of claim 4, wherein the epoxy resin component consists of at least one glycidyl ether selected from the group of glycidyl ethers of: resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane, bis-(4-hydroxyphenyl)-methane, novolac resins, and combinations thereof.

7. The composition of claim 4, wherein the epoxy resin component consists of at least one dihydric phenol of the following structure:

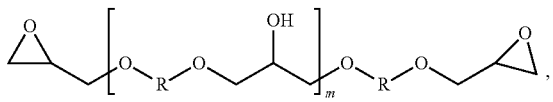

wherein m is 0 to 25 and R is a divalent hydrocarbon radical.

8. The composition of claim 4, wherein the epoxy resin component consists of at least one member selected from the group of: bis(3,4-epoxycyclohexyl methyl)oxalate, bis(3,4-epoxycyclohexylmethyl)adipate, bis(3,4-epoxy-6-methylcyclohexylmethyl)adipate, vinylcyclohexene diepoxides; limonene diepoxide; bis(3,4-epoxycyclohexyl methyl)pimelate; dicyclopentadiene diepoxide, 3,3-epoxycyclohexylmethyl-3,4-epoxycyclohexane carboxylate, 3,4-epoxycyclohexylmethyl-3,4-epoxycyclohexane carboxylate; 3,3-epoxy-1-methylcyclohexyl-methyl-3,4-epoxy-1-methylcyclohexane carboxylate; 6-methyl-3,4-epoxycyclohexylmethylmethyl-6-methyl-3,4-epoxycyclohexane carboxylate; 3,4-epoxy-2-methylcyclohexyl-methyl-3,4-epoxy-3-methylcyclohexane carboxylate, and combinations thereof.

9. An article of manufacture comprising the composition as set forth in claim 4, wherein the article is selected from the group consisting of filament wound pipes and fittings, filament wound pressure vessels, low and high pressure pipes and fittings, low and high pressure vessels, storage tanks, wind turbine blades, automotive structural parts, aerospace structural parts, oil and gas buoyance modules, rigs, well plugs, cured-in-place-pipe (CIPP), structural bonding adhesives and laminates, encapsulants, semiconductors, corrosion resistance coatings, a composite liner and epoxy containing applications.

* * * * *